United States Patent
Breuls et al.

(10) Patent No.: US 6,739,157 B1
(45) Date of Patent: May 25, 2004

(54) METHOD OF APPLYING A PROTECTIVE ORGANIC COATING TO AN OPTICAL GLASS FIBRE

(75) Inventors: Antonius Henricus Elisabeth Breuls, Urmond (NL); Marinus Jacob De Fouw, Eindhoven (NL)

(73) Assignee: Plasma Optical Fibre B.V., Eindhoven (NL)

( * ) Notice: Subject to any disclaimer, the term of this patent is extended or adjusted under 35 U.S.C. 154(b) by 0 days.

(21) Appl. No.: 09/720,448

(22) PCT Filed: Jun. 21, 1999

(86) PCT No.: PCT/NL99/00383

§ 371 (c)(1),
(2), (4) Date: Mar. 26, 2001

(87) PCT Pub. No.: WO00/00446

PCT Pub. Date: Jan. 6, 2000

(30) Foreign Application Priority Data

Jun. 26, 1998 (NL) .............................................. 1009503

(51) Int. Cl.$^7$ .............................................. C03C 25/24
(52) U.S. Cl. ............................ 65/432; 65/430; 65/443; 65/424; 65/32.4; 65/60.1; 65/60.3; 427/163.2; 427/162; 385/123; 385/126; 385/127; 385/128; 385/130

(58) Field of Search .......................... 65/430, 443, 424, 65/432, 32.4, 60.1, 60.3; 427/163.2, 162; 385/123, 126–127, 128, 130

(56) References Cited

U.S. PATENT DOCUMENTS 4,792,347 A * 12/1988 Deneka et al. ................ 65/3.11

OTHER PUBLICATIONS

Jochem et al., "High–Speed Bubble Free Coating Of Optical Fibres On A Short Drawing Tower", IOOC, Oct. 1, 1985, pp. 515–518, XP002006367.*

* cited by examiner

Primary Examiner—Peter Chin
Assistant Examiner—Mark Halpern
(74) Attorney, Agent, or Firm—Seed IP Law Group PLLC

(57) ABSTRACT

The invention relates to a method of applying a protective organic coating to an optical glass fiber, said glass fiber is drawn from a preform and passed through a liquid which contains the material for forming said organic coating, once the amount of liquid coating material to be applied to the fiber has been adjusted, said coating matrial is hardened, while a gas is passed along the liquid wherein nitrous oxide (an $N_2O$-containing gas) is used as said gas. The invention also relates to the coated optical glass fiber, produced by that method.

9 Claims, No Drawings

METHOD OF APPLYING A PROTECTIVE ORGANIC COATING TO AN OPTICAL GLASS FIBRE

The invention relates to a method of applying a protective organic coating to an optical glass fibre or to a coated optical glass fibre, wherein said glass fibre is drawn from a preform and passed through a liquid which contains the material for forming said organic coating, wherein, once the amount of liquid coating material to be applied to the fibre has been adjusted, wherein a gas is carried past the coating material is hardened and a gas is passed along the coating material.

A method of this kind is known from EP-A-0 261 772. In the claims of said patent application it is stated that $CO_2$ is used as said gas, thus minimizing the number of air inclusions that may form upon forming of the coating. The surface of the coating material of the glass fibre is conditioned by means of $CO_2$. It is stated in the introduction of EP-A-0 261 772 that various gases may be used, such as nitrogen, carbon odioxide, noble gases, in particularly xenon, neosan and argon, and chemically inert gaseous hydrocarbons such as chloroform, Freon (brand name), halogen hydrocarbons or other chlorine- or fluorine-substituted hydrocarbons In particular, however, $CO_2$ is used.

A method of the above kind is also known from EP-B-0200256, wherein it is indicated that xenon and dichlorodifluoromethane are gases which are usable within this framework.

Further research has shown that a higher-quality bond of the organic material to the glass fibre is obtained by using a gas other than those which have been proposed so far. Accordingly, the present invention is based on the use of a gas other than those which have been used so far. According to the invention, the method as stated in the introduction is therefore characterized in that nitrous oxide (an $N_2O$-containing gas) is used as said gas. The term nitrous oxide as used herein should be understood to mean a gas which contains at least 50% $N_2O$.

Preferably, the gas is introduced at the upper side of the device for applicating the organic coating material to the fiber. We also found that with the method according to the invention it also is possible to applicate a second or third organic coating layer to an allready coated fibre. The amount of gas supplied to the liquid organic coating material depends on the construction of the device for applicating the coating material and the drawing speed. Nevertheless this amount must be sufficient for preventing entrained air, that comes along with the fibre, to become entrapped in the coating. The amount of gas can be minimized by using specific nozzles or a small diameter shaft.

The invention furthermore relates to the optical glass fibre provided with a protective organic coating formed in accordance with a method wherein an $N_2O$-containing gas is used as said gas.

We claim:

1. A method for coating an optical glass fibre or a coated optical glass fibre, comprising drawing a glass fibre from a preform and passing it through an organic liquid coating composition that contains material for forming an organic coating, followed by adjusting the amount of liquid coating composition to be applied to the fibre, and curing of the liquid coating composition to form a solid protective organic layer there on, wherein a gas is conducted over the liquid coating composition, and nitrous oxide (an $N_2O$-containing gas) is used as said gas.

2. The method of claim 1, characterized in that said nitrous oxide is introduced to said liquid coating composition at the upper side thereof, at a place where the fibre is supplied into the liquid coating composition.

3. A coating method, comprising:
   drawing an optical glass fibre from a preform and passing it through an organic liquid coating composition containing material for forming an organic coating;
   adjusting the amount of liquid coating composition to be applied to the obtical glass fibre; and
   curing the liquid coating composition to form a solid protective organic layer on the optical glass fibre, comprising conducting a gas containing nitrous oxide over the liquid coating composition.

4. A coating method, comprising:
   drawing an optical glass fibre from a preform and passing it through an organic liquid coating composition containing material for forming an organic coating;
   adjusting the amount of liquid coating composition to be applied to the obtical glass fibre; and
   curing the liquid coating composition to form a solid protective organic layer on the optical glass fibre, comprising conducting a gas containing nitrous oxide over the liquid coating composition on an upper side thereof and carried downstream along with the optical glass fibre.

5. The method of claim 3, wherein the gas contains at least 50% nitrous oxide.

6. A method for coating a coated optical fibre, comprising:
   passing the coated optical glass fibre through an organic liquid coating composition that contains material for forming an organic coating;
   adjusting the amount of liquid coating composition to be applied to the coated optical glass fibre; and
   curing the liquid coating composition to form a solid protective organic layer on the coated optical glass fibre, comprising conducting a gas containing nitrous oxide over the liquid coating composition.

7. The method of claim 6, wherein the gas containing nitrous oxide is introduced to the liquid coating composition at an upper side thereof where the coated optical glass fibre is supplied into the liquid coating composition.

8. The method of claim 6, wherein the gas contains at least 50% nitrous oxide.

9. The method of claim 6, wherein the gas is supplied in an amount the coated optical glass fibre from becoming entrapped in the coating.

* * * * *